United States Patent [19]
Magill

[11] Patent Number: 5,574,721
[45] Date of Patent: Nov. 12, 1996

[54] ORTHOGONAL CODE TRACKING SYSTEM HAVING PHANTOM CARRIER SIGNAL

[75] Inventor: David T. Magill, Palo Alto, Calif.

[73] Assignee: Stanford Telecommunications, Inc., Sunnyvale, Calif.

[21] Appl. No.: 353,538

[22] Filed: Dec. 9, 1994

[51] Int. Cl.$^6$ ...................................................... H04J 13/00
[52] U.S. Cl. .................................. 370/18; 370/19; 370/22; 375/200; 375/206; 380/34; 455/33.1
[58] Field of Search ................................ 370/18, 19, 22; 375/205, 200, 206; 379/58; 455/33.1; 380/34

[56] References Cited

U.S. PATENT DOCUMENTS

| | | | |
|---|---|---|---|
| 4,460,992 | 7/1984 | Gutleber | 370/19 |
| 5,204,874 | 4/1993 | Falconer et al. | 375/1 |
| 5,204,876 | 4/1993 | Bruckert et al. | 375/1 |
| 5,309,474 | 5/1994 | Gilhousen et al. | 375/1 |
| 5,375,140 | 12/1994 | Bustamante et al. | 375/1 |
| 5,377,226 | 12/1994 | Davis | 375/1 |

*Primary Examiner*—Melvin Marcelo
*Assistant Examiner*—Melissa Kay Carman
*Attorney, Agent, or Firm*—Jim Zegeer, Esq.

[57] ABSTRACT

An OCDMA communication system in which channel signals are bandwidth spread according to a PN code and each channel is identified by a selected one of a set of RW code accesses. The set of RW codes is reduced by predetermined one (preferably $RW_0$). Each transceiver has acquisition and tracking circuitry which search for a null (e.g., the unsent RW access code) falling lower than a predetermined threshold value and synchronizing tracking on detection of the null.

2 Claims, 3 Drawing Sheets

ORTHOGONAL CODE TRACKING SYSTEM HAVING PHANTOM CARRIER SIGNAL

BACKGROUND OF THE INVENTION

Prior work has established the advantages of orthogonal CDMA (OCDMA) over the more conventional quasi-orthogonal CDMA (QOCDMA) which is often referred to as asynchronous CDMA. OCDMA advantages stem from the fact that it has virtually no access noise and, thus, can support a greater number of users and is much less sensitive to power control errors. An OCDMA system is described in U.S. patent application Ser. No. 980,957 (which is incorporated herein by reference). As an example system a wireless PBX application was used. In this example, which used the ISM bands, it was possible to use time-division duplexing (TDD) which readily permitted certain time synchronization signals to be sent in a time-slot dedicated to their exclusive use. Thus, it was possible to easily obtain the timing necessary to operate an OCDMA system.

There are many bands in which it is not possible to use TDD and one must use frequency-division duplexing (FDD). In such cases, for several reasons one may not wish to use a separate dedicated time slot for timing signals. However, it is still necessary to derive and maintain accurate receive timing at the subscriber terminals. The object of this invention is to provide a novel technique for achieving accurate receive timing at subscriber terminals operating in an OCDMA system.

The Problem

The problem occurs for the situation in which a mobile or subscriber unit is trying to maintain pseudo-noise (PN) code lock on the signal emanating from the base station. When fully loaded, this composite signal consists of the complete set of Rademacher-Walsh (RW) signals each of equal power and in perfect time synchronism. The same PN code modulates each RW signal while different data is phase modulated on each channel(typically using OPSK modulation for reasons of bandwidth efficiency). The subscriber or mobile terminals must be able to maintain receive code lock with this signal in order to demodulate data from the base station and to be enabled to transmit signals back to the base station.

If the OCDMA signal is fully loaded and one attempts to track the PN/RW code on any RW channel using the conventional, non-coherent cross-correlation approach shown in FIG. 1, one will find the task virtually impossible for the reason to be explained shortly. Now consider the operation of the non-coherent delay-lock loop (DLL) of FIG. 1 operating on a single PN signal. If the received signal arrives early, the power output of the early cross-correlator 10-E will exceed that of the late cross-correlator 10-L and a negative voltage will be created in the difference circuit 14. The power outputs are obtained by integrating 11-E, 11-L, the outputs of the early and late cross-correlators 10-E, 10-L over a data symbol duration and sampling (with the illustrated switches 12-E, 12-L) the complex voltages at the end of the symbol. These voltages are then squared 13-E, 13-L to obtain power. This negative voltage will be input (after suitable filtering by the illustrated low-pass filter 15) to the voltage-controlled oscillator (VCO) 16 (whose output controls the PN/RW function generator 17) and the time base slowed down allowing the reference time base to align itself with the received time base. The opposite would occur if the received signal arrived late, i.e., a positive voltage would be generated and the local time base sped up to achieve synchronism. It is clearly crucial to the successful operation of the DLL to generate a strong delay discriminator function from the early and late cross-correlators.

The problem for a fully loaded OCDMA system(with all signals of equal power, which is the most likely case)is that the cross-correlation at the correct time is identical in power to that at offsets of any integer number of chips. When the delay discriminator is formed using the conventional one chip offset the early and late cross-correlators yield the same power and as a result the output is zero. Consequently, no tracking can take place.

If the OCDMA system is not fully but heavily loaded, a discriminator function will be generated using the conventional approach. However, it will have a gain considerably less than that of the unique technique disclosed herein. Due to the reduced gain inferior tracking performance will result. If the system is only partially loaded and the signals have different power levels, the conventional approach can have a wide range in discriminator gains. In addition, the polarity of the gain may be inverted resulting in a catastrophic failure of the tracking loop.

THE PRESENT INVENTION

The Phantom Carrier Signal problem can be solved according to this invention, by reducing the total number of RW channels by one and using a novel acquisition and tracking circuitry. Thus, rather than using all $2^n$ accesses one would use only $2^n - 1$, e.g., 15 and 31. Typically one would eliminate $RW_o$ front the set. This carrier is referred to as the "phantom carrier signal or phantom carrier" since it is possible to track it even though it is not radiated. To acquire receive code synchronization at the subscriber terminal one world use $RW_o$ for the local reference waveform for the correlator. Rather than looking for a peak exceeding a threshold value one would search for a null falling lower than a threshold value. It is desirable to search in steps no larger than ½ of a PN/RW chip in order to maximize the probability of detection.

DESCRIPTION OF THE DRAWINGS

The above and other objects, advantages and features of the invention will become more apparent when considered with the following specification and accompanying drawings wherein.

Δ= duration of one chip,

= pseudo-noise

RW = Rademacher-Walsh $a_i(t)+jb_i(t)$= complex representation of QPSK modulated signal, Ⓜ=complex multipier $(.)^2$ =square law detector

DETAILED DESCRIPTION OF THE DRAWINGS

Figure 2:
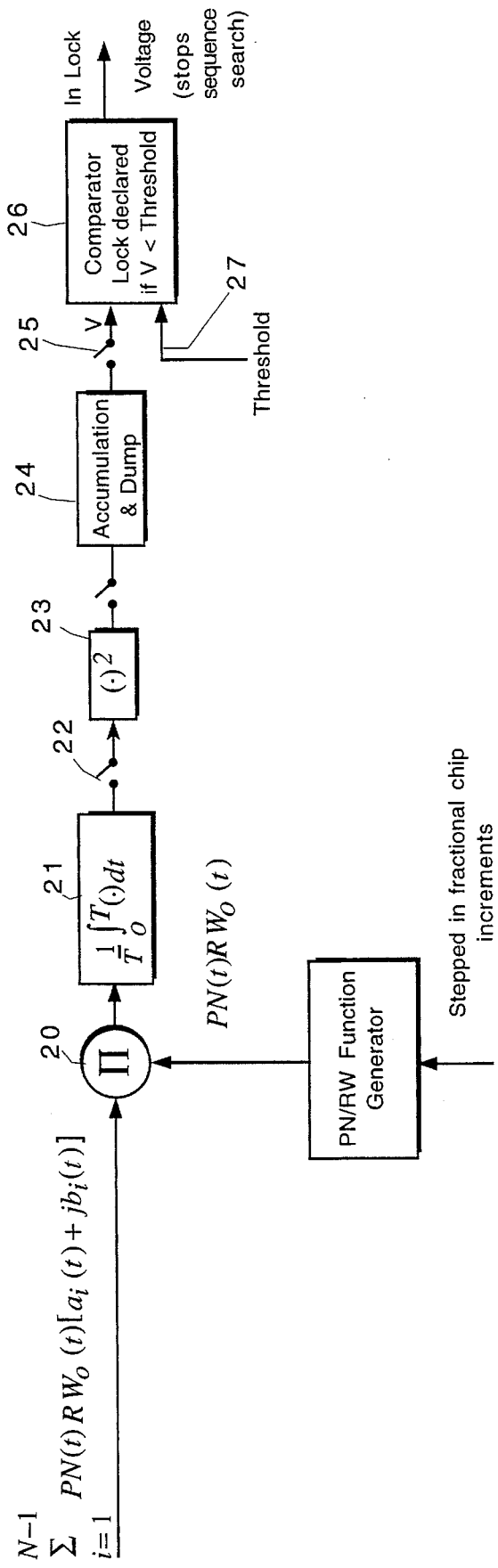
FIG. 2 is a block diagram of acquisition circuit for the phantom carrier technique. In this diagram the phantom carrier is $RW_0$ (note that it is not present in the received composite signal)

FIG. 2 is a block diagram of the novel acquisition circuitry which is based on an envelope cross-correlator.

This form of cross-correlation permits code acquisition in the presence of data modulation and with considerable phase jitter as might be caused by multipath propagation. In this figure complex notation is used to represent, the variables.

The form of the novel acquisition circuit is quite similar to that of a conventional acquisition detector. However, there are two major differences. First, the reference signal used by the cross-correlator is $$PN(t) * RW_0(t)$$

where the signal is not in the received composite signal $$\sum_{i=1}^{N-1} PN(t-\tau) * RW_0(t-\tau) * [a_i(t-\tau) + jb_i(t-\tau)]$$

where $[a_i(t-\tau)+jb_i(t-\tau)]$ is the i-th QPSK signal given in complex form.

By contrast, the conventional acquisition circuit must use a reference signal that is present in the received signal. Hence, the name phantom carrier signal is applied to the techniques of this invention.

The correlation mixer 20 (or multiplier as denoted by the π symbol) produces a complex-valued output that is operated on by a complex-valued integrate-and dump(I&D) circuit 21. The integration period T corresponds to a symbol duration which will represent multiple PN/RW chips. Typical values might be 16, 32, or 64 depending on the size of the RW set. At the end of each QPSK symbol the I&D output is sampled(by the illustrated switch 22) and the power determined by a squaring operation. The output of the square-law detector 23 (which is real valued and in sampled data format) is applied to another I&D 24 which accumulates these samples over a longer time interval so as to provide a more reliable acquisition detector. The output of this accumulator is periodically sampled 25 (the period corresponding to the dwell time at that code phase) and compared 26 with a selected threshold level 21.

The second difference (as compared to the conventional approach) is that the output of the cross-correlator is expected to be very low (or nil) rather than high when the time base of the reference signal is properly aligned with the time base of the received signal. In fact, if there were no noise present perfect time alignment would yield an output of zero. Thus, the acquisition circuit for the phantom carrier signal concept must search for a minimum rather than a maximum. With the illustrated system this is done by comparing the accumulator 24 output with a threshold level. If the output exceeds the threshold, the search continues with the system either advancing or retarding(depending on the selected algorithm) the reference code time base by a fraction of a chip (nominally ½) and repeating the cross-correlation process using any of many known search algorithms.

If the output is less than the threshold value, acquisition is declared and the code tracking circuits activated.

The particular acquisition circuit shown is the threshold detector and has been selected for illustrative purposes due to its simplicity and frequent use. Other implementations may offer better performance. For example, if one simply measured the cross-correlation voltage in ½ chip increments over the whole PN code period and picked the lowest value one would not need to be concerned with selecting the correct threshold level in a dynamic environment with a large range in received signal level. Use of the phantom carrier signal concept extends to this acquisition circuit in a manner obvious to those skilled in the art. The phantom carrier signal concept can be similarly extended in a straightforward manner to other acquisition circuits.

Figure 1:
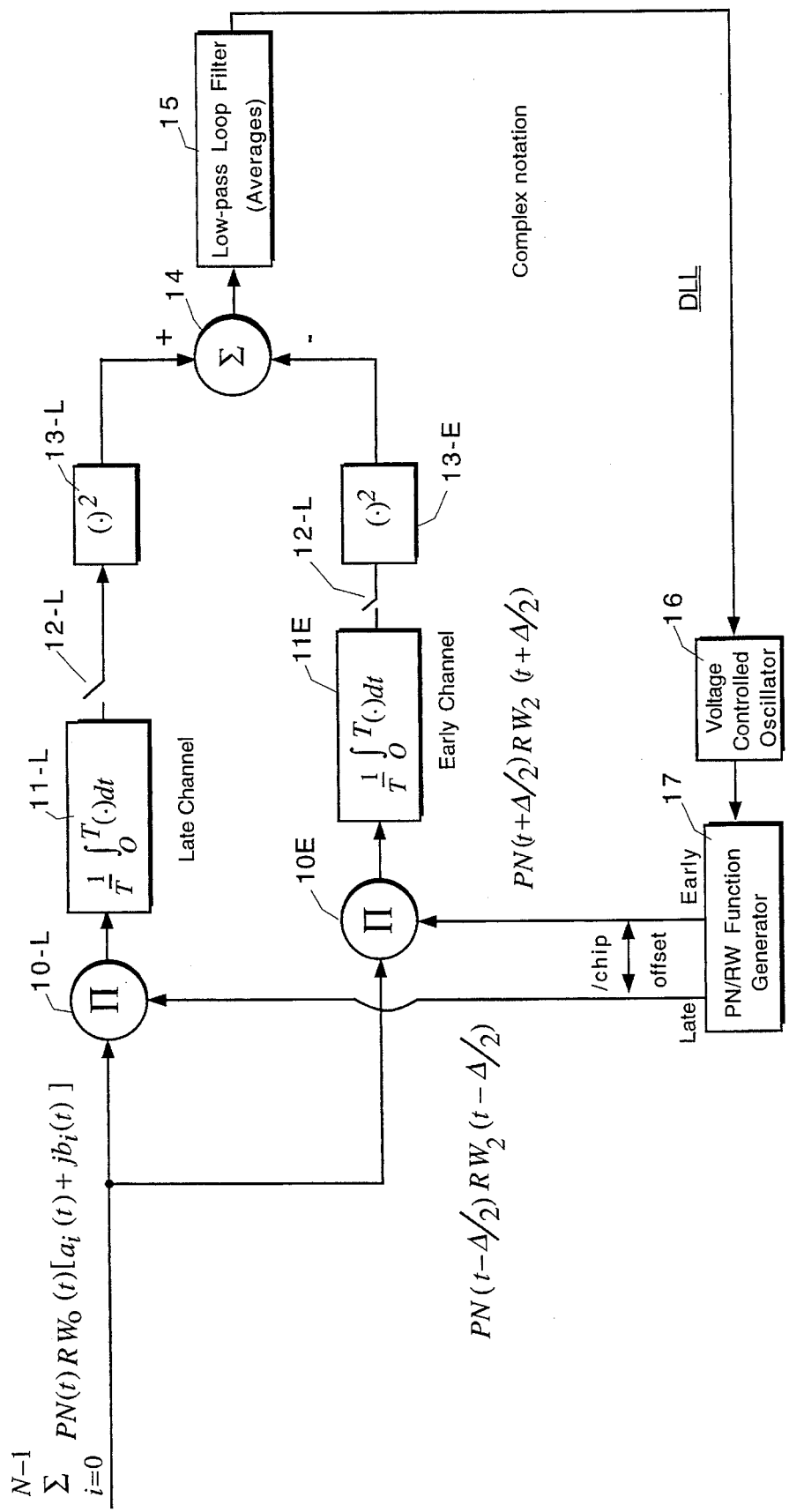
FIG. 1 is a block diagram of a conventional 1 Δ delay-lock loop operating on composite signal from the base station.
Figure 3:
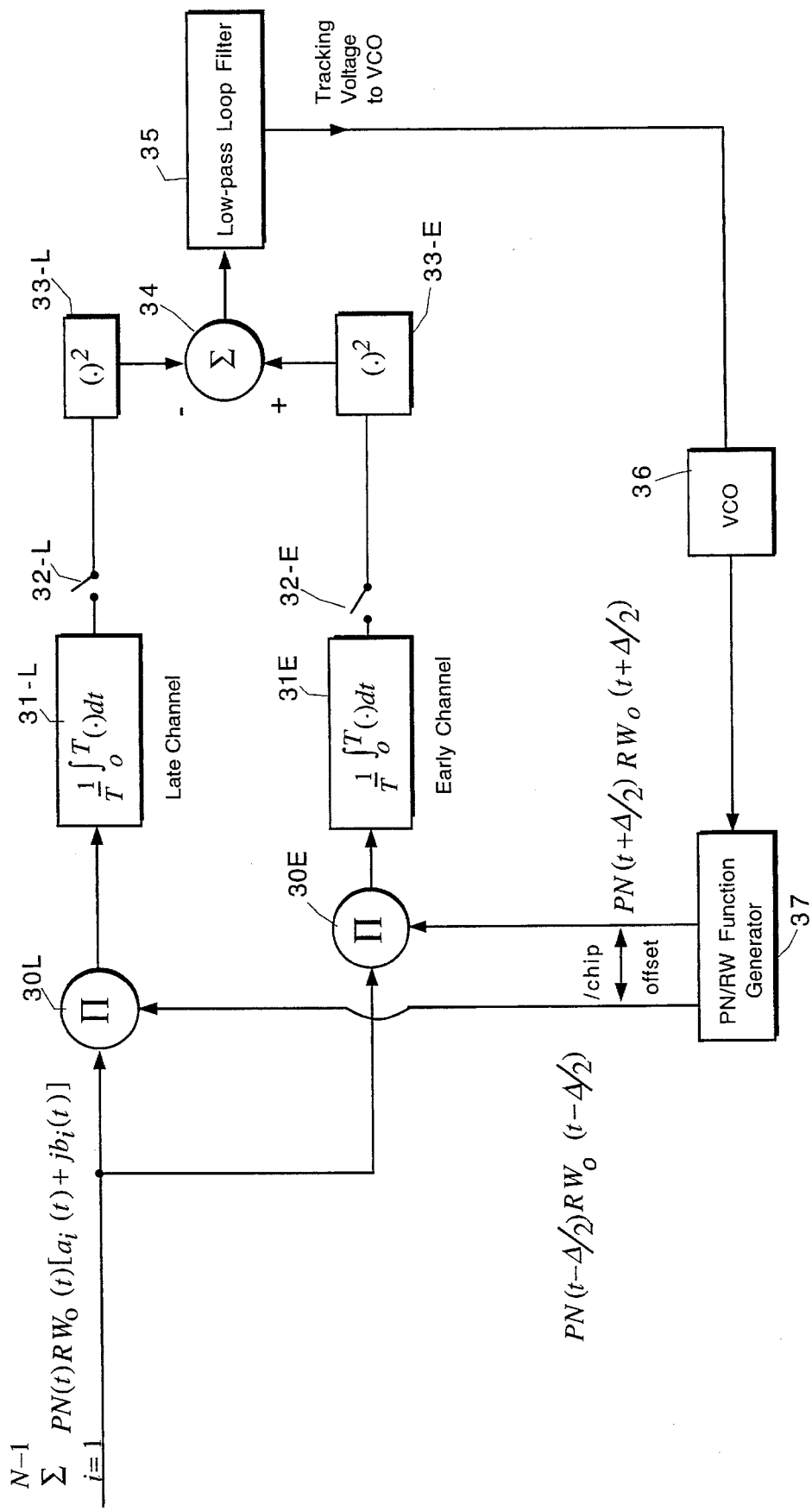
FIG. 3 is a block diagram of the delay discriminator for the phantom carrier technique. Note that while the phantom carrier ($RW_0$ code) is used as a reference signal for the cross-correlators there is no $RW_0$ signal present in the received signal.

FIG. 3 is a block diagram of the novel delay discriminator circuitry which provides good code tracking capability when it is used to replace the discriminator illustrated in FIG. 1. Note that it is identical in form (being constituted by cross-conductors 30-L, 30-E, integrators 31-L, 31-E, samples 32-L, 32E, different circuit 34, loop filter 35, VCO 36, and PN/RW generator 37) and differs only in that the early and late cross-correlator reference signals are based on the phantom carrier signal, i.e., PN (t) *RWO (t), rather than the PN/RW code associated with the channel to be demodulated. Also, note that the polarity of the discriminator is reversed from that obtained with a conventional discriminator. Thus, the phantom carrier delay-lock loop(DLL), which differs from a conventional DLL only in the discriminator function polarity and the reference codes, must include a gain which is negative with respect to the conventional delay-lock loop.

With these changes to the conventional DLL it is possible to obtain good tracking performance on OCDMA signals. The performance will be essentially identical to or superior to that obtained with a conventional DLL operating on quasi-orthogonal CDMA signals. If the OCDM system is fully loaded (with the exception of the phantom carrier signal), superior tracking performance will be obtained since it will track on multiple signals which will yield a higher signal-to-noise ratio (SNR). For example, for the case of a 32-ary PN/RW signal set this will give the equivalent improvement of a 15 dB increase in SNR.

If one were to try code tracking using the conventional DLL on a fully loaded OCDMA equal power signal set, there would be no useful discriminator voltage produced at all. Thus, the invention disclosed herein is advantageous to obtain acceptable tracking performance.

The above described the novel discriminator approach uses the phantom carrier $PN(t)*RW_o(t)$ for the reference signal for the delay discriminator. For the detection of the data the punctual cross-correlator must use $PN(t)*RW_k(t)$ where k denotes the particular channel to be detected. Thus, one uses the phantom carrier for tracking and the desired carrier, i.e., RW code, for data demodulation.

It should be noted that the use of the phantom carrier concept does eliminate one of the RW channels from the set thereby apparently reducing the traffic carrying capacity slightly. With 16-ary or higher order RW set sizes the loss is minimal. Furthermore, it should be noted that often other alternatives use one of the PN/RW codes for a sounding or carrier signal and encounter the same loss in traffic carrying capacity.

While preferred embodiments of the invention have been shown and described, it will be appreciated that various modifications and adaptations of the invention will be readily apparent to those skilled in the art and such modification and adaptations are intended to be encompassed within the spirit and scope of the invention.

What is claimed is:

1. In an orthogonal code division multiple access spread spectrum communication system having at least one central transceiver station and a plurality of subscriber transceiver stations in which a plurality of channel signals are bandwidth spread according to a pseudorandom noise (PN) spreading code and each channel signal is identified by a selected one of a set of Rad emacher Walsh (RW) code accesses and a PN/RW chip is either a one or a zero that arises from the mod-2 addition of a PN chip with a RW chip , the improvement comprising, said set of RW codes being reduced by a predetermined one of said set of RW codes, each said transceiver station including acquisition circuitry including means to search for a null falling lower than a predetermined threshold value, and means synchronizing tracking of received signals on detection of said null.

2. In an orthogonal code division multiple access spread spectrum communication system having at least one central transceiver station and a plurality of subscriber transceiver stations in which a plurality of channel signals are bandwidth spread according to a pseudorandom noise (PN) spreading code and each channel signal is identified by a selected one of a set of Rademacher Walsh (RW) code accesses and a PN/RW chip is either a one or a zero that arises from the mod-2 addition of a PN chip with an RW chip, the improvement comprising, said set of RW codes being reduced by a predetermined one of said set of RW code, each said transceiver station including acquisition circuitry including means to search for a null falling lower than a predetermined threshold, value, and means synchronizing tracking of received signals on detection of said null and wherein said search is in steps no larger than ½ of a PN/RW chip in order to maximize probability of detection.

* * * * *